Nov. 24, 1953
B. W. STRÖMBERG
2,660,719
POSITION INDICATOR
Filed July 30, 1951
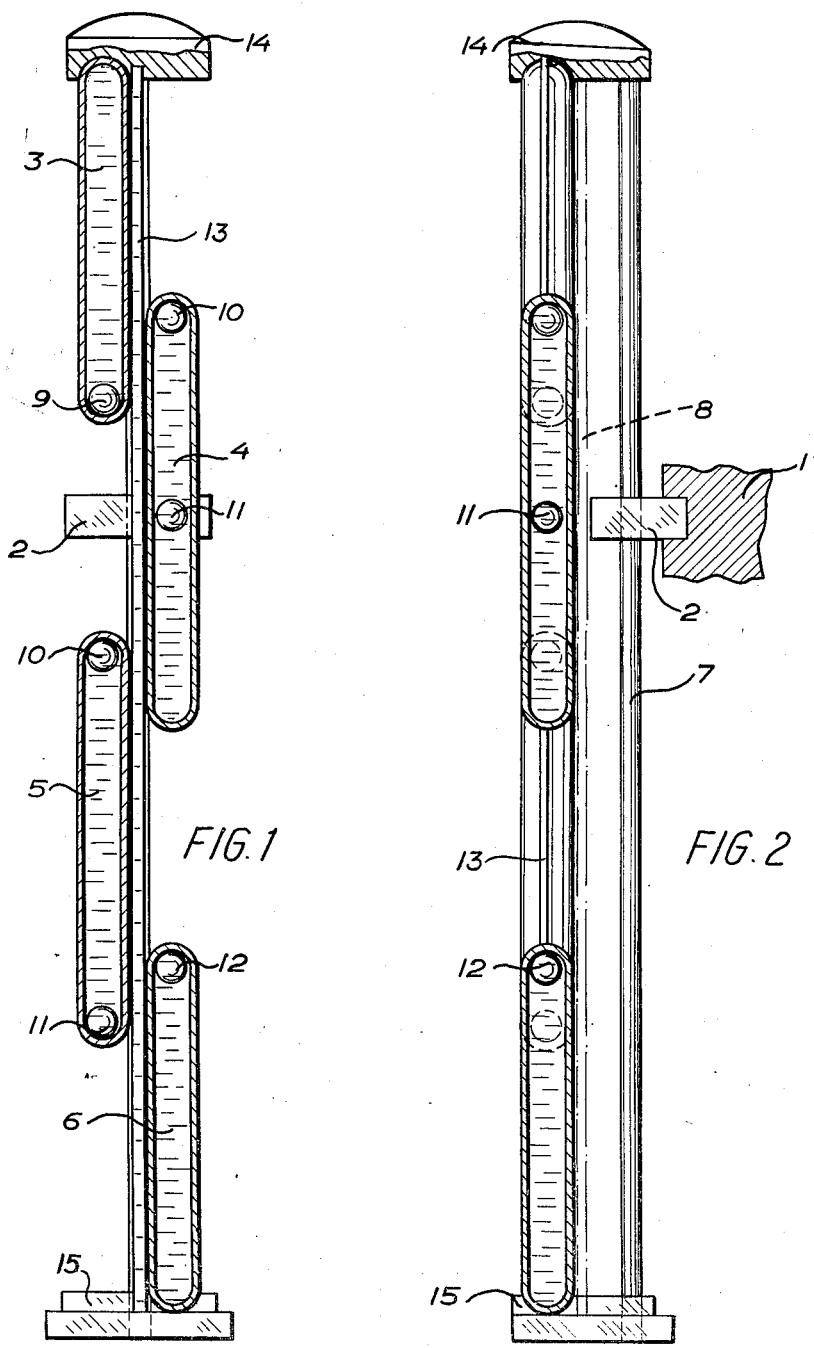
INVENTOR
B. W. Stromberg
BY
Henry C. Parker
ATTORNEY Patented Nov. 24, 1953

2,660,719

UNITED STATES PATENT OFFICE 2,660,719

POSITION INDICATOR

Bror Wilhelm Strömberg, Stockholm, Sweden

Application July 30, 1951, Serial No. 239,305

4 Claims. (Cl. 340—282)

This invention relates to means for indicating the position of a substantially vertically movable member such as a disk valve, a pointer, a float or the like and the main object of the invention is to provide an improved indicator for all-round purposes which is adapted to indicate the position of a substantially vertically movable member over as long a path as may be desired and which may be assembled of an arbitrary member of units each shorter than the entire length of said indicating path and thus less damageable and easier replaceable.

The invention also has for its object to provide an improved indicator which may be used for indicating the position of a substantially vertically movable member over only a part of the path of said movable member and which is always ready to start indication independent of the side from which the member usually or alternatively enters the indicated part of its path.

These and other objects will become apparent from the following description of a specific embodiment of the invention shown in the enclosed drawing, to which, however, the invention is not in any respect confined as it may be widely varied within the scope of the appended claims.

In the drawing—

Fig. 1 is a schematic front view of an indicating device, and

Fig. 2 is a side view thereof.

The indicator generally comprises a vertically movable member 1 the actual position of which should be indicated, a magnet 2 carried by said member 1 and a number of separate indicator tubes 3, 4, 5 and 6, each extending substantially parallel and close to the path of said magnet 2.

The member 1 may be considered as a screw operated valve, a float or anything else able to cause the magnet to move substantially vertically e. g. a wire, a rod or a lever connecting it to a movable body. It is not at all necessary that the magnet 2 should have a straight vertical path—it may also have a vertically curved or inclined path and in such a case the tube or tubes 3—6 should be correspondingly arranged to substantially follow said path.

The illustrated embodiment is only intended to show the general arrangement and features of the invention to allow the man skilled in the art to readily apply the inventive idea to solve such an indicating problem as he may currently have at hand without being forced to spend time and labor in translating the construction from a certain practical application, where it may be difficult to recognize the different means, to another application, where the different means are quite different but still capable to serve the same purpose. Therefore, in the illustrated embodiment, the magnet 2 is shown as being vertically guided by a rod 7, though this rod may be dispensed with if the magnet is rigidly secured to the movable member 1 and this member in turn guided in any suitable way to secure a predetermined path of the magnet.

The magnet 2 may be movable inside a non-magnetic wall 8, which is shown by dash-and-dot lines because it forms no necessary part of the combination but may be present in several applications. In such a case the indicator tubes 3—6 are preferably mounted close to the outside of said wall and the magnet 2 arranged to move close to the inside thereof so that the magnetic field of said magnet embraces the indicator tubes in spite of the presence of the intermediate wall 8.

The path of movement of the magnet 2 is limited by an upper and a lower stop 14 and 15 respectively, which, of course, may also be arranged to cooperate with the movable member 1 itself instead of with the magnet, if the magnet is rigidly secured to the member 1 as above suggested.

The indicator tubes 3 to 6 are all transparent and made of a non-magnetic material, preferably glass, and each of them is closed and filled with a transparent damping liquid, such as water, oil or the like. The tubes are arranged one above the other in partly overlapping order to form a column extending over the entire length of the path of the magnet, but each tube has a length shorter than said path and it will be readily appreciated that, if indication is desired over a certain part of the path of the magnet only, there may be provided a less number of tubes, say one or two. In such applications, however, each tube has a general function fully equivalent to the function of either of the tubes 3—6 herein described and no inventive effort will be necessary to make the choice.

In each of the indicator tubes 3 to 6 there is enclosed at least one sphere or ball which is submerged in the damping liquid in the tube. Each sphere or ball is made of a material which is readily magnetizable by induction but which shows no tendency to remain magnetic. Thereby the creation of certain magnetic poles in the ball is avoided and the ball will thus be uniformly attracted all around by the magnet 2, this fact causing the ball or sphere to roll and not slide along the inner surface of the indicator tube when following the movements of the member, whereby the sensibility of the indicator is highly increased.

Preferably, the ball, which serves as an index, is a sheet iron sphere but it may also be an iron-metalized cork ball or the like.

The upper indicator tube 3 houses one such ball 9 only and this ball 9 has an average density slightly exceeding the density of the surrounding damping liquid in said tube 3. Consequently, the ball 9 will always occupy a lowermost position in the tube 3 when not influenced by the magnet 2, but it will readily follow the magnet, when the latter comes up within that part of its path of movement corresponding to or covered by the tube 3.

The intermediate or middlemost indicator tubes 4 and 5 house each two such balls 10 and 11, the upper one 10 of which has an average density slightly lower than that of the surrounding damping liquid in the tubes, while the lower one 11 of said balls has an average density slightly exceeding that of said damping liquid. Thereby the upper ball 10 is caused to occupy an uppermost resting position in the tube, when it is not actuated by the magnet 2, while the lower ball 10 under the same circumstances will occupy a lowermost resting position in the tube exactly as the ball 9 in the upper tube 3.

The lower tube 6 houses again a single ball 12, the average density of which is slightly lower than the density of the surrounding damping liquid in the tube 6, that ball 12 corresponding to the balls 10 in the middlemost tubes 4 and 5 and consequently occupying an uppermost resting position in the tube 6, when not actuated by the magnet 2.

Each tube 3—6 covers a certain part of the path of movement of the magnet 2, but to allow continuous indication over the whole length of this path the tubes overlap one another in vertical order by a distance slightly exceeding twice the diameter of the balls 9—12.

Along with the column of tubes 3—6 there is provided a suitable scale 13 with which the ball just actuated may cooperate to give a distinct measure of the elevation of the magnet and hence of the movable member 1.

The indicator operates in the following manner:

Assuming that the magnet 2 is in the position shown in the drawing, it is evident that the magnet has recently moved upwardly from the range covered by the indicator tube 5 because the lower ball 11 is currently following the magnet 2 and that ball had to be picked up near the lower end of the tube 4. If the magnet is caused to raise further thereby leaving the range covered by the tube 4 and entering the range covered by the upper tube 3, the ball 11 in the first mentioned tube will be stopped at the end of the tube by the upper ball 10 therein but shortly before that the magnet 2 has started influencing the ball 9 in the upper tube 3 too and finally this latter ball 9 only follows the magnet upwardly. As soon as the magnet 2 is far enough from the ball 11 recently actuated that ball returns to its lower resting position in the tube 4.

Assuming now that the magnet 2 is caused to sink, the ball 9 in the upper tube 3 will be retarded at the lower end of said tube and maintained in this position until again passed by the magnet. Just before the ball 9 is stopped the magnet 2 has started actuating the upper ball 10 in the tube 4 and this latter ball will follow the magnet to the lower end of the tube 4, where, in a similar manner, the ball 10 is stopped by contacting the lower ball 11 therein. Now the upper ball 10 in the next tube 5 will follow the magnet further downwards and finally the ball 12 in the lower tube 6 will take over the indicating function, every ball returning to its normal resting position as soon as the actuation by the magnet has ceased.

It is evident that a continuous indication may be obtained over as long a path as may be desired, but should it be desired to indicate the position of the magnet over a shorter part of its path only, one or more of the indicator tubes may be dispensed with as previously mentioned. For instance, the tube 4 may be used solely to allow indication over an intermediate part of the path or the tube 3 may be used to allow indication over an uppermost part of said path and so on.

The man skilled in the art will readily appreciate the possibility to use a non-conducting liquid in the indicator tubes and to let the ball or balls serve as a short-circuiting means between two or more electrical terminals entering the tube, whereby the indicator may be adapted to control a suitable relay or a remote indicating or operating unit.

I claim:

1. Means for indicating the position of a substantially vertically movable member comprising in combination a plurality of substantially vertical, separate, transparent tubes of a non-magnetic material, said tubes being arranged one above the other in partly overlapping order, each of said tubes being filled with a transparent damping liquid, a magnet actuated by said movable member to move within the total range of said column and externally along said tubes, at least one ball of an inductively magnetizable material enclosed in each of the uppermost and lowermost tubes of said column, the ball in the uppermost tube having a density slightly exceeding that of the damping liquid, the ball in the lowermost tube having a density slightly lower than that of the damping liquid, two magnetizable balls in each of the intermediate tubes of said column, the lower one of these balls in each tube having a density slightly exceeding and the upper one having a density slightly lower than the density of said damping liquid, said balls being all freely movable up and down in said respective tubes when influenced by said movable magnet and alternatively actuated by said magnet to allow consecutive indication of the position of the magnet and hence of the movable member over the whole length of said column of tubes.

2. Means for indicating the position of a substantially vertically movable member comprising in combination a plurality of substantially vertical, separate transparent tubes of a non-magnetic material, said tubes being arranged one above the other, each of said tubes being filled with a damping liquid, a magnet actuated by said movable member to move externally along said column of tubes, and two balls of magnetizable material enclosed in each of said tubes and freely movable therein when under the influence of said magnet, one of said balls in each of said tubes having an average density slightly lower than the density of said liquid, the other ball in each tube having an average density slightly exceeding the specific gravity of said liquid in said tubes, each of said tubes partly overlapping each adjacent tube in said column a distance exceeding twice the diameter of said balls.

3. Means for indicating the position of a substantially vertically movable member comprising in combination two substantially vertical, separate, transparent tubes of a non-magnetic material arranged one above the other, each of said tubes being filled with a transparent damping liquid, a magnet actuated by said movable member to move externally along said column of tubes, and a ball of inductively magnetizable material enclosed in each of said tubes and freely movable therein when influenced by said magnet, the ball in the lower one of said tubes having an average density slightly lower than the density of said liquid and the ball in the upper one of said tubes having an average density slightly exceeding the density of said surrounding liquid.

4. Means for indicating the position of a substantially vertically movable member comprising in combination a substantially vertical, separate, transparent tube of a non-magnetic material, said tube being filled with a damping liquid, a magnet actuated by said movable member to move externally along said tube and beyond both ends thereof, and two balls of magnetizable material enclosed in said tube and freely movable therein under the influence of said magnet, one of said balls having an average density slightly lower than the density of said liquid, and the other ball having an average density slightly exceeding that of the liquid.

BROR WILHELM STRÖMBERG.

References Cited in the file of this patent

UNITED STATES PATENTS

| Number  | Name   | Date          |
|---------|--------|---------------|
| 995,414 | Nault  | June 13, 1911 |
| 2,233,572 | Atkins | Mar. 4, 1941 |